US006569272B2

(12) United States Patent
Tychsen

(10) Patent No.: US 6,569,272 B2
(45) Date of Patent: May 27, 2003

(54) PROCESS FOR CUTTING OUT PANELS OR THE LIKE

(75) Inventor: Detlef Tychsen, Löhne (DE)

(73) Assignee: Kronotec AG, Lucerne (CH)

( * ) Notice: Subject to any disclaimer, the term of this patent is extended or adjusted under 35 U.S.C. 154(b) by 115 days.

(21) Appl. No.: 09/825,349

(22) Filed: Apr. 4, 2001

(65) Prior Publication Data

US 2001/0047702 A1 Dec. 6, 2001

(30) Foreign Application Priority Data

Apr. 18, 2000 (DE) ........................................ 100 19 054

(51) Int. Cl.[7] ........................... B32B 31/18; B32B 3/14; B26D 1/00; B26D 1/14; B26D 5/00

(52) U.S. Cl. ......................... 156/64; 156/250; 156/259; 156/263; 156/512; 83/34; 83/73; 83/360; 83/364; 83/365; 83/371; 83/425; 428/50

(58) Field of Search .......................... 156/64, 250, 258, 156/259, 263, 264, 269, 271, 298, 512; 83/34, 35, 52, 73, 360, 364, 365, 370, 371, 425; 428/50

(56) References Cited

U.S. PATENT DOCUMENTS

| | | | | |
|---|---|---|---|---|
| 2,877,846 A | | 3/1959 | Tobey | |
| 3,885,483 A | | 5/1975 | Ikeya et al. | |
| 4,471,823 A | * | 9/1984 | Wadell | 144/246 F |
| 4,688,540 A | * | 8/1987 | Ono | 125/13 R |
| 6,102,023 A | * | 8/2000 | Ishiwata et al. | 125/13.01 |
| 6,250,990 B1 | * | 6/2001 | Yoshii et al. | 451/5 |
| 6,421,456 B1 | * | 7/2002 | Son et al. | 382/145 |

FOREIGN PATENT DOCUMENTS

| | | | |
|---|---|---|---|
| DE | 3517714 A1 * | 1/1987 | B27B/5/06 |
| DE | 2242304 | 9/1990 | |
| DE | 41 91 940 T 1 | 6/1991 | |
| DE | 42 34 284 A 1 | 10/1992 | |
| JP | 51-31593 | 5/1993 | |
| JP | 51-31594 | 5/1993 | |
| JP | 51-31595 | 5/1993 | |
| JP | 51-40678 | 6/1993 | |
| JP | 51-48315 | 6/1993 | |
| JP | 52-16599 | 8/1993 | |
| JP | 51-4293 | 10/2000 | |
| WO | WO 99/61212 | 12/1999 | |

* cited by examiner

*Primary Examiner*—Jerry A Lorengo
(74) *Attorney, Agent, or Firm*—McGuireWoods LLP

(57) ABSTRACT

A wood fiber board (6) which is provided with a decorative layer (3) of paper or similar material, and where the length or width value of the decorative layer (3) deviates from its original value after it is applied to the wood fiber board (6), is cut into uniform panels using a board-dividing apparatus that compensates for these deviations. The board-dividing apparatus has a saw (1) that preferably has a plurality of saw blades ($S_1, S_2, \ldots S_n$) which are adjustably spaced in parallel fashion. The board-dividing apparatus is equipped with a number of cameras and with controller which utilizes deviation measurement information to adjust the spacing of the saw blades. The wood fiber board (6) is first aligned with at least one initial camera (4_a_) at a point $P_1$. Then, predetermined points ($P_1$ and $P_2$) in the decorative layer (3) are recorded by the first camera (4_a_) and a second camera (4_b_). A distance (L) between the points ($P_1$ and $P_2$) is determined, and thee discrepancy in the width or length value is determined by comparison of the actual position and the desired position of the points ($P_1$ and $P_2$). Then, the value of the determined discrepancy (A) is placed in relation to the number (n) of the saw blades ($S_n$), and the parallel spacing (a) of the saw blades ($S_n$) is modified by the value of the ratio of the discrepancy to the number of saw blades (A/n). The orientation of the wood fiber board (6) to the saw (1) is displaced to one side in the amount of one half the determined discrepancy (A), and then the wood fiber board (6) is transported toward the saw (1) for cutting out the panels.

8 Claims, 3 Drawing Sheets

PROCESS FOR CUTTING OUT PANELS OR THE LIKE

BACKGROUND OF THE INVENTION

1. Field of the Invention

The invention is directed to a process for cutting panels, or the like, from a wood fiber board which is provided, in particular, with a decorative layer basically consisting of paper, where the length and/or width value of the decorative layer deviates from its original value after it is applied to the wood fiber board, which process employs a board-dividing apparatus exhibiting at least one saw, where the saw is formed by a plurality of saw blades which are adjustably spaced in parallel fashion.

2. Background Description

Panels are employed in, e.g., flooring, particularly laminate flooring. The desired decoration (parquet, wood graining, floor tiles, etc.) is printed on a paper web, which is then coated with artificial resin and rolled onto a roller. The decorative web thus prepared is then applied to the wood fiber boards at the floor manufacturer. With the printing of the decoration onto the paper web, the later sealing of the paper web with artificial resin, and the subsequent attachment of the decorative layer by means of pressure and temperature to the wood fiber board, the dimensions of the paper are modified. The paper grows both in length (lengthwise growth) and width (widthwise growth). If this decorative board is only to be cut into individual panels, the growth in length and width must be taken into account, since otherwise there will be a non-uniform distribution of the decoration on the individual panels. The result of this would be that the floor composed of an unevenly distributed decorative layer would exhibit gaps in the decoration on the connecting rims of the panels. Even if these gaps amount to only a few millimeters, they are noticeable upon closer observation, and this has a negative aesthetic effect and thus diminishes the quality of the laid-out floor.

In order to manufacture according to quality standards, the paper growth must be ascertained and the saw adjusted accordingly. Since this occurs manually, the process is very time-consuming and therefore cost-intensive. If the dimensions are not correctly determined, the danger of immediately producing rejects is high. Particularly when joined tiles are printed as decoration, slight discrepancies in individual panels are noticeable at the joint abutments. A discrepancy of only 2 mm is unacceptable since this could entail the complete displacement of the joint. Thus the saw must be permanently reset, which highly increases the cost of the panels.

SUMMARY OF THE INVENTION

According to the invention an automated cutting process with the paper growth taken into account is performed using the following steps:

- the wood fiber board is aligned with at least one initial camera;
- a defined, predetermined point in the decorative layer is recorded by each of the first camera and a second camera;
- the distance between the points is determined;
- the discrepancy in the width or length value is determined by comparison of the actual position and the desired position of the points;
- the value of the determined discrepancy A is placed in relation to the number n of the saw blades;

- the parallel spacing of the saw blades is modified by the value of the ratio of the discrepancy to the number of saw blades A/n;
- the orientation of the wood fiber board to the saw is displaced to one side in the amount of one half the determined discrepancy; and then
- the wood fiber board is transported toward the saw for cutting out the panels.

Instead of setting the value of the determined discrepancy into relation with the number of saw blades and then adjusting the parallel distance accordingly, as an alternative it is possible to set the determined distance between the points (actual value) into relation with the number of saw blades and then to adjust the parallel spacing between the saw blades to the value of the ratio of the distance to the number of saw blades (L/n).

With this process, it is possible to automatically record or determine the paper growth and, with the resulting data, to adjust the saw and to position the wood board in front of the saw, without the need for conceptual activity, which is fundamentally subject to risk of error. Since a reproducible adjustment is made again and again, the quality of the sawed panels is very high. Even difficult decorations, e.g., file decorations, can be processed with a high level of quality and in a cost-effective way.

If another defined point is recorded with a third camera and the actual position of the points is again compared with the desired position of the points, the growth in the other direction can simultaneously be determined. In keeping with the determined data, both the longitudinal saw and the transverse saw are adjusted, and the wood board is moved in one direction by half the amount of the offset from the saw; here the offset, i.e., the growth in length and width, do not have to be identical, and the overall result is that even a complicated behavior can be controlled. Instead of identifying defined points in the decorative layer with the camera, it is also possible to apply markings to the edge of the paper web, markings which can be detected by the cameras. With this measure it is possible to apply the process according to the invention even when a low-contrast decoration is involved.

Ideally the determined discrepancy will be stored with an added amount for tolerance. Other boards that follow the first board, which was measured in the manner described above, are brought into line with the first camera, and the discrepancy in the width and/or length value is then determined. The discrepancy thus determined is compared with the total of the discrepancy of the first board less the tolerance addition, and only if the discrepancy of the later board is greater than that of the first board less the tolerance range will there be a new adjustment of the saw blades and a new repositioning of the wood fiber board by half the amount of the discrepancy or, as the case may be, only then will the saw be moved up by the corresponding amount.

With this measure it is possible to individually adjust the tolerance to the given decoration, which permits production to be immediately adjusted to the demanded or accepted standard of quality. Thus, in a tile decoration it will be necessary to select a fundamentally smaller tolerance range than is the case with a grooved floor decoration or a veneer decoration. The saw blades can be positioned on a common shaft. It is also possible to form the saw from individually driven saw blades, whose distance from each other is adjustable.

BRIEF DESCRIPTION OF THE DRAWINGS

The foregoing and other objects, aspects and advantages will be better understood from the following detailed description of the preferred embodiments of the invention with reference to the drawings, in which.

DETAILED DESCRIPTION OF THE PREFERRED EMBODIMENTS OF THE INVENTION

Figure 3:
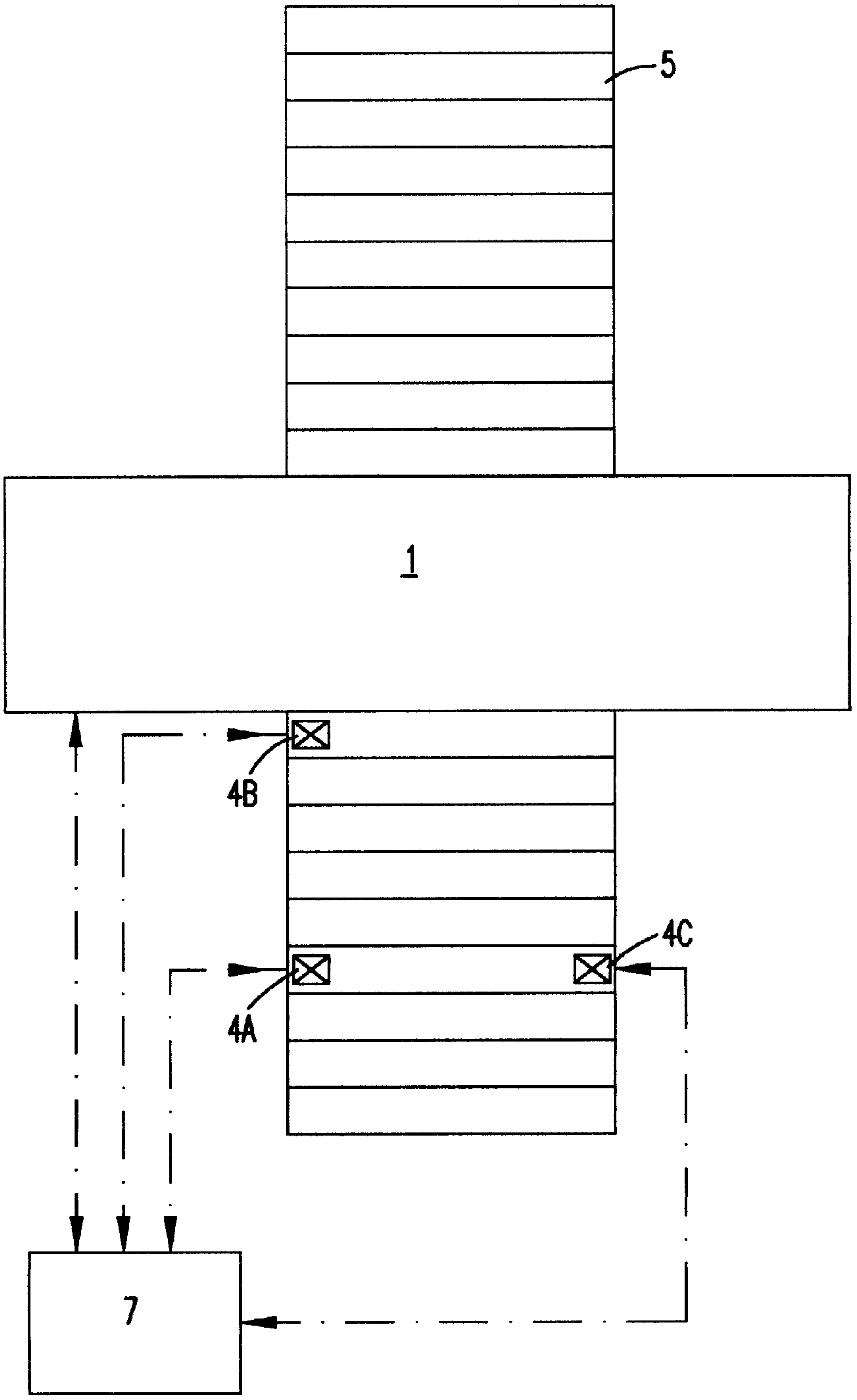
FIG. 3 is a schematic top view of a board-dividing apparatus.

FIG. 3 shows a board-dividing apparatus that is provided with a roller path 5, onto which the wood fiber panel 6 furnished with a decorative layer 3 can be laid. The board-dividing apparatus is provided with a saw 1 that consists of a plurality of saw blades $S_1$, $S_2$, $S_3$, $S_4$, $S_5$, $S_6$, that are positioned in parallel fashion. The saw blades $S_n$ are spaced at a distance of a. They can be positioned individually or on a common shaft 2. With the saw 1 depicted here the wood fiber panel 6 could be divided in the longitudinal direction. To divide the wood fiber panel 6 in the transverse direction, a transverse saw (not shown here) would be positioned with a 90° shift. After a wood fiber panel 6 is divided in the longitudinal and transverse direction, the individual panels are fed to a milling device for profiling, which is not shown here in greater detail.

Three cameras 4*a*, 4*b*, 4*c* are positioned in front of the saw and above the roller path. Defined points $P_1$, $P_2$, $P_3$ in the decoration 3 are selected which can be detected by the cameras 4*a*, 4*b*, 4*c*. Instead of points in the decoration, markings (for example, lines) that the cameras can detect may be made on the edge. The actual position of the points $P_1$, $P_2$, $P_3$ relative to each other or, as the case may be, the desired position of the markings relative to each other is stored in a computer 7, which is operationally linked both with the cameras 4*a*, 4*b*, 4*c* and with an adjusting device for the saw 1, which is not shown in detail here.

A wood panel 6 provided with a decoration 3 is placed in front of the saw 1 on the roller path 5 and connected with a transport device, which is not shown here in detail. The transport device moves in the longitudinal and transverse direction and is used to align the panel 6 with the camera 4*a*, until the predetermined, defined point $P_1$ is detected by the camera 4*a*. The point $P_1$ here serves to calibrate the system and indicates the desired position. The actual position of the point $P_2$ is detected with the camera 4*b*, and the actual position of the point $P_3$ is detected with the camera 4*c*.

The discrepancy A between the stored desired position and the detected actual position is determined in the computer 7. This determination is made both in the longitudinal direction ($P_1$/4a–$P_2$/4b) and in the transverse direction ($P_1$/4a–$P_3$/4c). The calculated discrepancy A is divided by the number n of saw blades $S_1$, $S_2$, . . . $S_n$. Then the saw 1 is guided by the computer 7 in such a way that the parallel spacing a of the individual saw blades $S_1$, $S_2$, . . . $S_n$ relative to each other is increased or decreased by the value A/n. In the exemplary embodiment the saw 1 is provided with six saw blades, so that the same parallel spacing a between the blades is increased or decreased by ⅙ A.

Figure 2A:
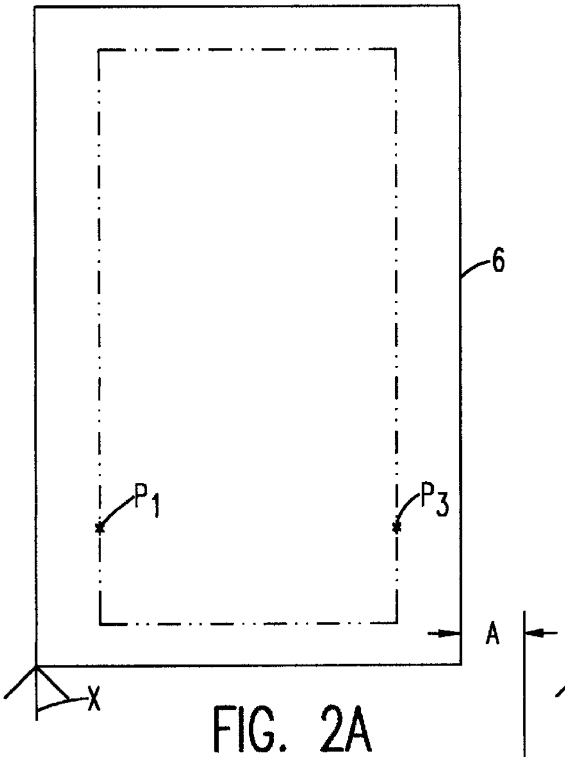
FIG. 2*a* is a diagram of a board with optimal growth of the decorative layer.
Figure 2B:
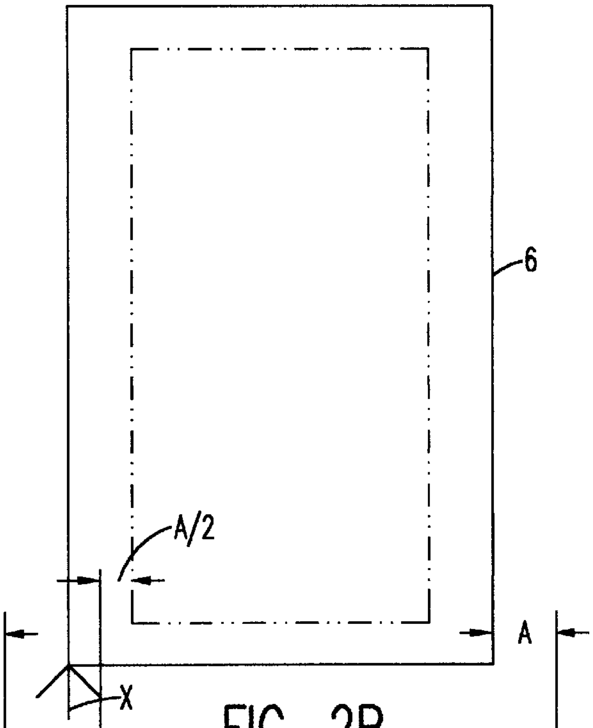
FIG. 2*b* is a diagram of a board with optimal growth of the decorative layer.

The growth in the longitudinal or transverse direction of the paper layer is uniform, to be sure, but it can only be recorded on one side. A comparison of FIGS. 2*a* and 2*b* shows that the relative position of the point $P_1$ is unchanged, while point $P_3$ has migrated further outwards (to the right in the drawing) by the value A.

Figure 1:
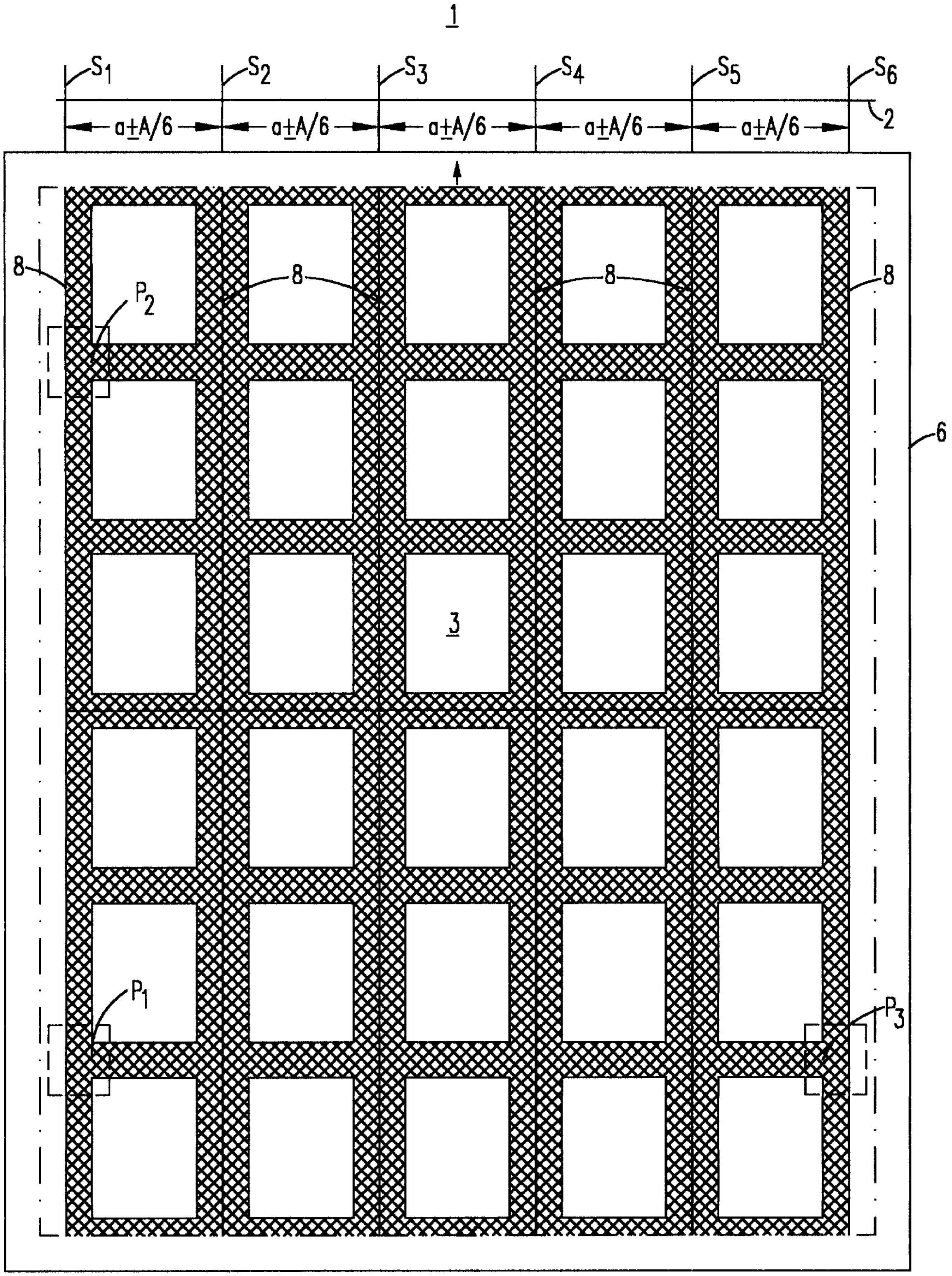
FIG. 1 is schematic top view of a board furnished with a decorative layer.
Figure 2C:
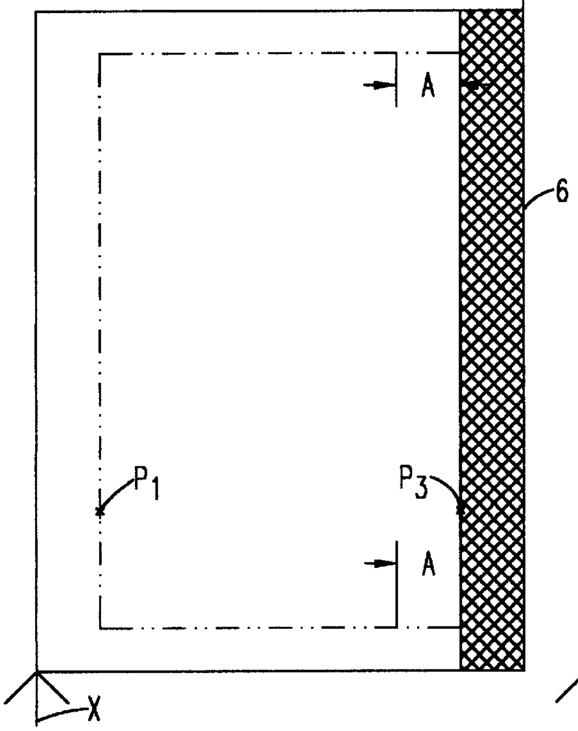
FIG. 2*c* is a diagram of a board with excessive growth of the decorative layer without an offset separating cut.
Figure 2D:
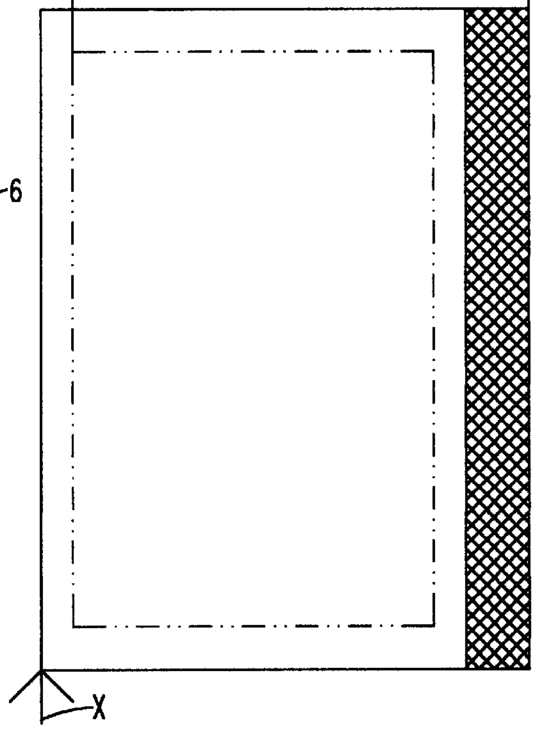
FIG. 2*d* is a diagram of a board with excessive growth of the decorative layer with an offset separating cut.

FIG. 1 makes clear how the saw blades $S_1$ . . . $S_6$ can be moved in parallel fashion and can be uniformly adjusted with a spacing of A+A/6. As FIG. 2*c* shows, the points $P_1$ and $P_3$ are equidistantly spaced from the given edge of the wood fiber board. As is known, in order for the cut panels to be later profiled with groove and spring, it is necessary to perform a separating cut, one which is executed with a smaller width on the spring side than on the groove side. If the positioning of the wood fiber board 6 in front of the saw 1 shown in FIG. 1 were retained, the panels would later exhibit an offset, since they would have to be fed to a stop for profiling in the corresponding machine. This stop for sizing is designated X in the FIGS. 2*a–d*. In order for this offset to be equalized, the wood fiber board 6 is again moved toward one side vis-a-vis the saw 1, by an amount of one half the offset A (cf. FIGS. 2*b* and 2*c*). In analogous fashion, it is naturally also possible for the parallel configuration of the saw blades $S_1$ . . . $S_6$ or the saw 1 to be offset by the value of A/2. The wood fiber board 6 would then be transported in the direction of the saw 1, where it would be divided in the longitudinal direction.

In a form not further described here, the wood fiber board 6 is then fed in the same fashion to the transverse dividing apparatus, where the transverse saw is positioned at a right angle to the saw 1, and the growth of the decorative layer in the longitudinal direction is dealt with in a fashion analogous to that already described. With the separating cut 8, the panels are cut out of the wood fiber board 6 in the longitudinal or transverse direction.

In the process described above, the board dividing apparatus is adjusted to the discrepancy A of the lengthwise or widthwise growth of the first board.

I claim:

1. A process for cutting panels from a substrate which has a wood base and decorative overlay, wherein said decorative overlay is of a material which has length and width values that deviate from their original values after said decorative overlay is applied to wood base, comprising the steps of:

detecting deviant length and width values from the original values of said decorative overlay by a detecting apparatus;

modiflying a spacing between saw blades, which are utilized to cut the panels from the substrate, based on a value of a ratio of the detected deviant length and width values divided by a number of said saw blades; and cutting said panels from said substrate using said saw blades.

2. A process for cutting panels from a wood fiber board which is provided with a decorative layer having a least length and a width value of the decorative layer which deviates from its original value after it is applied to the wood fiber board, which process employs a board-dividing apparatus exhibiting at least one saw, where the saw is formed by a plurality of saw blades ($S_1$, $S_2$, . . . $S_n$) which are adjustably spaced in parallel fashion, with the following steps:

the wood fiber board is aligned with at least one initial camera;

predetermined points in the decorative layer are recorded by the first camera and a second camera;

a distance between the points is determined;

a discrepancy in the width or length value is determined by comparison of the actual position and the desired position of the points;

a value of the determined discrepancy is placed in relation to the number of the saw blades ($S_n$);

parallel spacing of the saw blades ($S_n$) is modified by the value of the ratio of the discrepancy to the number of saw blades (A/n);

an orientation of the wood fiber board to the saw is displaced to one side in the amount of one half the determined discrepancy (A); and the wood fiber board is transported toward the saw for cutting out the panels.

3. A process for cutting panels from a wood fiber board which is provided with a decorative layer in which a length or width value of the decorative layer deviates from its original value after it is applied to the wood fiber board, which process employs a board-dividing apparatus having at least one saw that includes a plurality of saw blades ($S_1$, $S_2$, . . . $S_n$) which are adjustably spaced in parallel fashion, with the following steps:

a wood fiber board is aligned with at least one initial camera;

predetermined points in the decorative layer are recorded by the first camera and a second camera;

a distance (L) between first and second points is determined;

a discrepancy in the width or length value is determined by a comparison of the actual position and the desired position of the points;

a distance (L) is placed in relation to the number (n) of the saw blades ($S_n$);

a parallel spacing of the saw blades is adjusted to the value of the ratio of the spacing to the number of saw blades (L/n);

an orientation of the wood fiber board to the saw is displaced to one side in the amount of one half the determined discrepancy; and then the wood fiber board is transported toward the saw for cutting out the panels.

4. A process according to claim 2, wherein another defined, predetermined point is recorded by a third camera, a distance between the first and third points is determined, a discrepancy in the other width or length value is determined by a comparison of the actual position with the desired position of the points.

5. A process according to claim 2 wherein markings applied to the edge of the decorative layer are detected instead of defined points.

6. A process according to claim 2, wherein the saw blades ($S_n$) are positioned on a shared shaft.

7. A process according to claim 2, wherein the determined discrepancy (A) minus a tolerance range (T) is stored, the wood fiber board following an initial wood fiber board is aligned with the first camera, the discrepancy ($A_i$) in the width or length value is determined, the discrepancy ($A_i$) is compared with the sum of the discrepancy (A) and the tolerance range (T), and a new positioning of the parallel spacing of the saw blades ($S_n$) is made when the discrepancy ($A_i$) is greater than the sum of the discrepancy (A) and the tolerance range (T).

8. A process for cutting panels from a substrate which has a wood base and decorative overlay, wherein said decorative overlay is of a material which has length and width values that deviate from their original values after said decorative overlay is applied to wood base, comprising the steps of:

storing position information for at least a first and a second point on said substrate, said position information corresponding to a spacing between at least a first and a second saw blade of a saw having a plurality of parallel saw blades used to cut said panels;

detecting said first and second points on said decorative overlay;

determining a discrepancy between said first and second points detected on said decorative overlay and said position information stored in said storing step;

adjusting said spacing between said at least first and second saw blades by a value equal to said discrepancy determined in said determining step divided by a number of saw blades in said saw; and cutting said panels from said substrate using said saw.

* * * * *